United States Patent
Hen et al.

(10) Patent No.: US 7,404,193 B2
(45) Date of Patent: Jul. 22, 2008

(54) METHOD, SYSTEM, AND PROGRAM FOR ACCESSING DEVICE DRIVER FUNCTIONS

(75) Inventors: Shmuel Hen, Modi'in (IL); Tsippy Mendelson, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 10/654,743

(22) Filed: Sep. 3, 2003

(65) Prior Publication Data

US 2005/0050553 A1 Mar. 3, 2005

(51) Int. Cl.
G06F 3/00 (2006.01)
G06F 9/44 (2006.01)
G06F 9/46 (2006.01)
G06F 13/00 (2006.01)

(52) U.S. Cl. .................... 719/327; 710/10; 710/72

(58) Field of Classification Search .................. 719/321
See application file for complete search history.

(56) References Cited

U.S. PATENT DOCUMENTS

| | | | | |
|---|---|---|---|---|
| 5,136,709 A | * | 8/1992 | Shirakabe et al. | 717/164 |
| 5,390,301 A | * | 2/1995 | Scherf | 719/321 |
| 5,459,867 A | * | 10/1995 | Adams et al. | 719/321 |
| 6,003,097 A | * | 12/1999 | Richman et al. | 710/8 |
| 6,098,112 A | * | 8/2000 | Ishijima et al. | 719/321 |
| 6,496,847 B1 | * | 12/2002 | Bugnion et al. | 718/1 |
| 6,732,138 B1 | * | 5/2004 | Browning et al. | 718/102 |
| 6,754,736 B1 | * | 6/2004 | Ogawa et al. | 710/39 |
| 7,076,647 B2 | * | 7/2006 | Roth et al. | 713/100 |
| 2004/0176942 A1 | * | 9/2004 | Chochia et al. | 703/22 |

OTHER PUBLICATIONS

J. Corbet and A. Rubini, "Linux Device Drivers, 2nd Edition", Jun. 2001, O'Reily, chapters, 1,2,11,14, and 16.*
Ryan, S. J., "Synchronization in portable device drivers", Jan. 1999, SIGOPS Oper. Syst. Rev. 33, 1 , pp. 18-25.*
Arcomano, R., "Kernal Analysis- HOWTO", [online], v. 0.7, Mar. 26, 2003. Retrieved from the Internet at <URL: http://www.bertolinux.com>.
Christias, P., "ioctl- control device", *UNIX man pages*, [online], © 1994, [retrieved on May, 12, 2003]. Retrieved from the Internet at <URL: http://www.mcsr.slemiss.edu/cgi-bin/man-cgi?ioctl+2>.

* cited by examiner

*Primary Examiner*—William Thomson
*Assistant Examiner*—KimbleAnn Verdi
(74) *Attorney, Agent, or Firm*—Konrad Raynes & Victor LLP; David W. Victor

(57) ABSTRACT

Provided are a method, system, and program for communicating with a device. A kernel module is executed in memory and at least one kernel thread is executed in the memory to handle calls to device driver functions for the kernel module. The at least one kernel thread executes calls to device driver functions for the kernel module running in a kernel context.

27 Claims, 6 Drawing Sheets

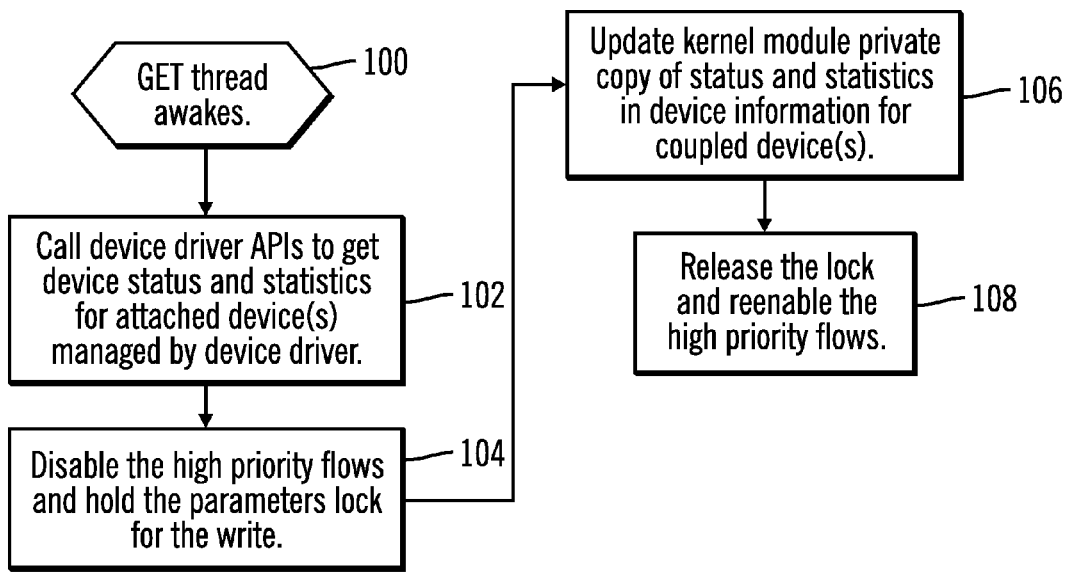
FIG. 4
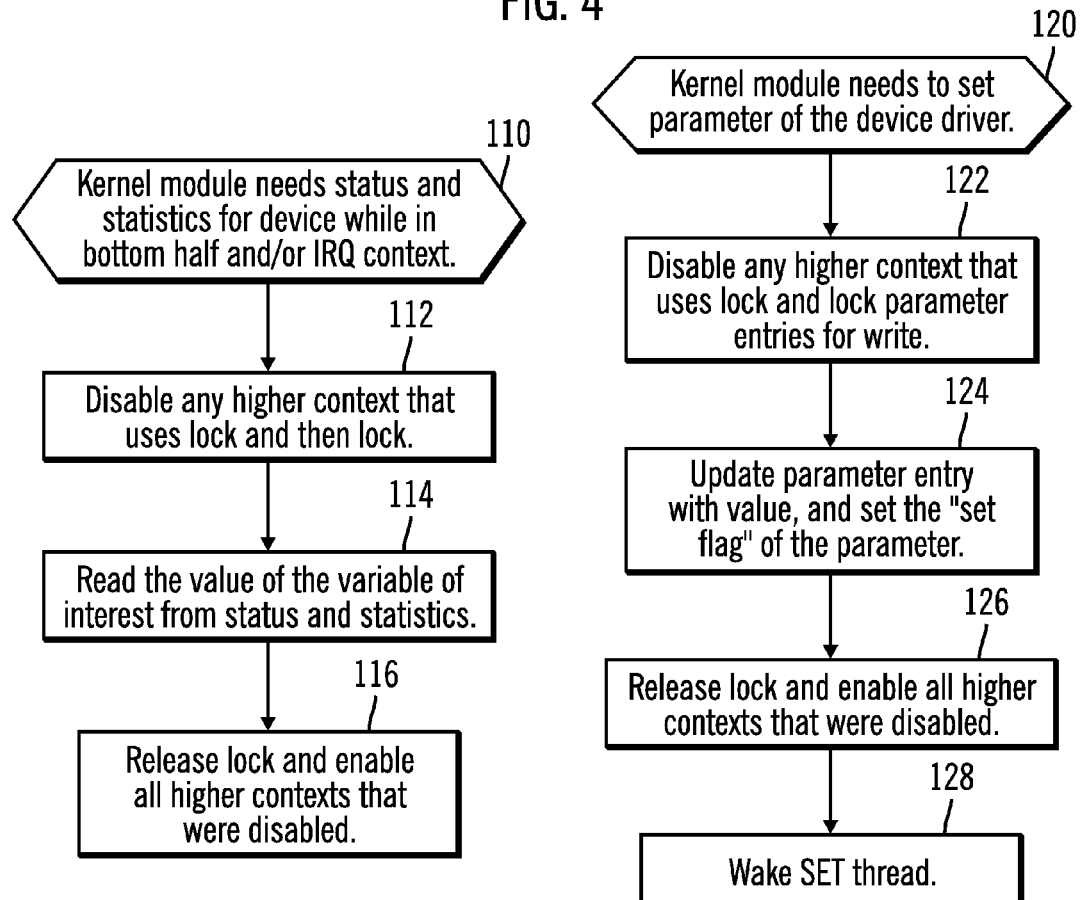
FIG. 5
FIG. 6

METHOD, SYSTEM, AND PROGRAM FOR ACCESSING DEVICE DRIVER FUNCTIONS

BACKGROUND OF THE INVENTION

1. Field of the Invention

The present invention relates to a method, system, and program for accessing device driver functions.

2. Description of the Related Art

A device driver is a program that includes device specific commands to communicate with and control attached devices. The device driver provides an interface between an operating system, such as Microsoft Windows®, Linux®, Unix®, etc., and a device, such as a network adaptor card, printer, video controller, etc., to enable the operating system and application programs executing therein to transmit commands to access information and control the device. In the Linux operating system, a user application program calls a device driver application program interface (API) via special IOCTL system calls to perform device related operations, such as getting network device statistics and setting device parameters such: as the Media Access Control (MAC) address for the device packet filtering, the maximum transmission unit (MTU)—which is the largest physical packet size transmitted on the network, etc.

The operating system runs a kernel, which is a central module of the operating system that is typically loaded first and remains in memory. The kernel is responsible for managing the execution of tasks and resource allocation, such as memory and processing resources. Tasks assigned by the kernel may execute in kernel mode or user mode. In kernel mode, tasks such as scheduling the running processes, interrupt handling, direct memory access, etc., are performed. In this mode, rescheduling (such as sleep operations) is not always allowed. User mode is for operations, such as running user applications and executing system service calls for applications. In this mode, rescheduling is allowed. Normally device driver APIs, such as the IOCTL commands, are initiated by system calls and therefore executed in user mode. Hence, device drivers are usually coded to process those APIs in a manner where processing may be rescheduled.

A kernel module, either statically linked or dynamically loaded, runs within the kernel and manages execution of code that must run at high priority and that needs privileged access to kernel resources. A device driver for example is a kernel module. An intermediate driver that is layered between the operating system and device drivers, and implements device teaming and other advanced features is also a kernel module.

A kernel module such as an intermediate driver usually operates in a high context (kernel mode), such as soft IRQ context (which includes timers, receive and transmit flows of an intermediate driver—formally known as bottom halves) or hard IRQ context. In certain situations, a kernel module may need to call the device driver's API directly. However, as discussed above, because the device driver's API is coded to run in user mode, this could cause a system crash.

BRIEF DESCRIPTION OF THE DRAWINGS

Referring now to the drawings in which like reference numbers represent corresponding parts throughout:

FIGS. 4, 5, 6, and 7 illustrate operations performed to execute device driver functions in accordance with described embodiments of the invention;

DETAILED DESCRIPTION OF EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
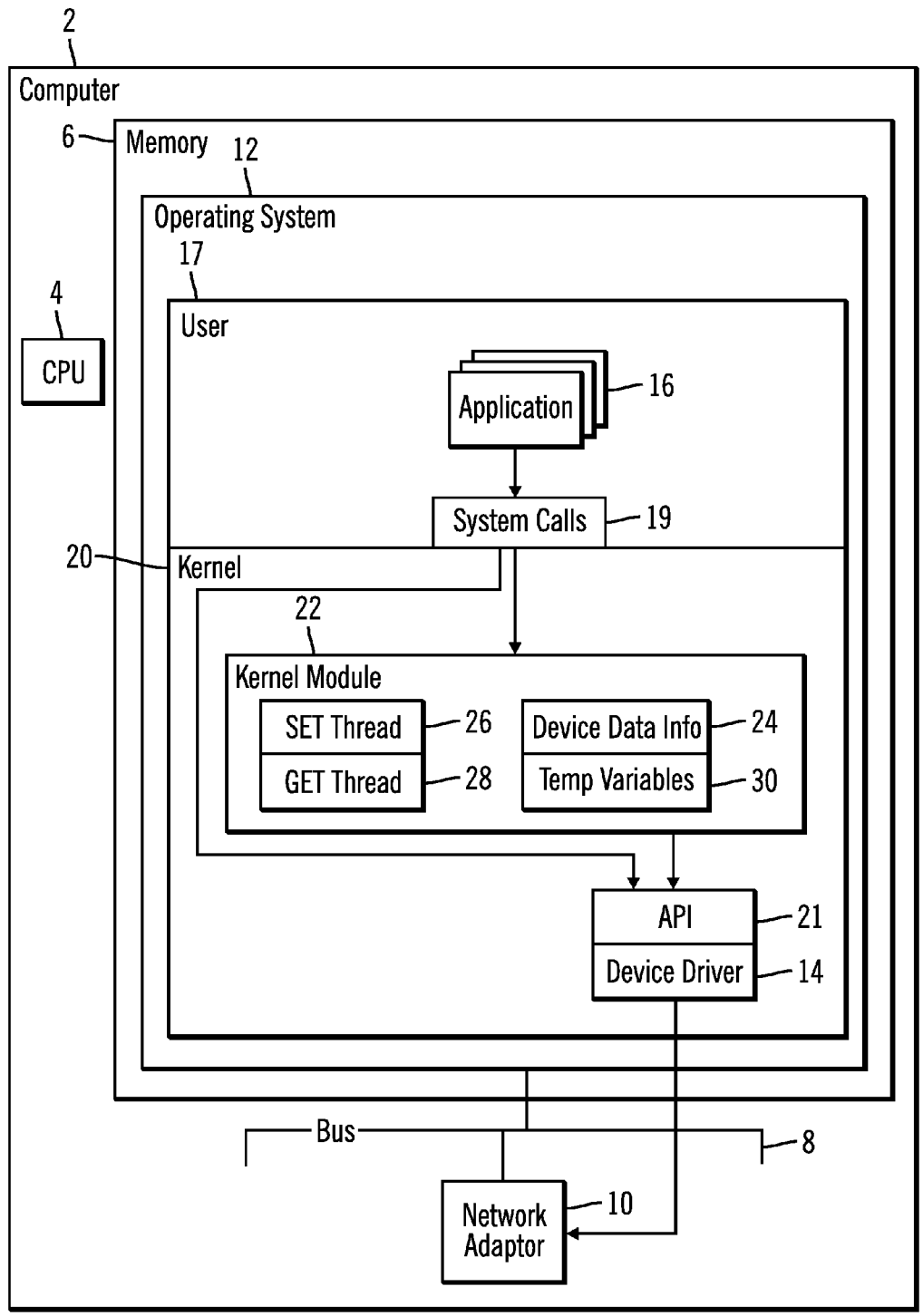
FIG. 1 illustrates a computing environment in which embodiments of the invention are implemented.

FIG. 1 illustrates a computing environment in which aspects of the invention may be implemented. A computer 2 includes one or more central processing units (CPUs) 4, a volatile memory 6, a bus interface 8 on which devices communicate data and interrupts to the computer 2. A network adaptor 10 communicates data and interrupts to the computer 2 via a bus interface 8. The bus interface 8 may be implemented using any Input/Output (I/O) bus technology known in the art, such as the Peripheral Component Interconnect (PCI), Industry Standard Architecture (ISA), the Video Electronics Standards Association (VESA), Micro Channel Architecture (MCA), Extended ISA, and any other known bus technology known in the art. Although the device is shown as a network adaptor 10, the device may comprise any I/O device known in the art, such as storage devices (e.g., tape drive, hard disk drive, optical disk drive, memory card reader, etc.), video controller, printers, etc. Further, although FIG. 1 only shows one bus 8, the computer 2 may include multiple busses.

The computer 2 further includes an operating system 12, which may comprise any operating system known in the art, such as a Microsoft Windows® operating system, Linux®, a Unix® type operating system, etc. The operating system 12 further runs a kernel 20, which is the central module of the operating system 12 that is typically loaded first and remains in memory 6. The operating system 12 further loads kernel modules into memory 6 to execute, such as a device driver 14 to interface with the device 10 recognized by the operating system 12 and any other code that must run at high priority and have privileged access to kernel resources. The device driver 14 includes device specific code to enable communication between the operating system 12 and the devices 10. The computer 2 further includes one or more applications 16 operating in a user context 17 that are capable of calling system calls 19, which in turn invoke device driver APIs 21 to access data or set registers in the device driver 14, such as IOCTL commands.

A kernel module may also initiate calls to the device driver APIs and access the device driver APIs directly. However, since the kernel module may be executing in the bottom half and/or IRQ context, the kernel module 22 may not access the device drivers safely.

The kernel module 22 maintains a private copy of device data information 24, such as link status, statistics, and settings of each network device 10 that it interacts with, and it accesses only this buffered data for both read and write operations. The device information 24 for one or more devices may be maintained in one or more data structures.

The kernel module 22 spawns two threads to execute device driver functions, a SET thread 26 and GET thread 28 to synchronize its private buffered device data 24 with that of the network device driver 10. A kernel thread, such as 26 and 28, is considered "contextless" and can therefore access the driver's API safely. The GET thread 28 periodically awakens to execute device driver APIs 21 that get dynamically changing device data such as the statistics and status of each device 10 managed by the device driver 14. For network adaptor devices, the status and statistics may include information on the link status and the receive and transmit activity of each adaptor for detecting link failure. The GET thread 28 buffers any accessed status and statistics in the kernel module's private copy of the device data structure 24. High priority (context) flows in the kernel module such as a timer that detects link failure, transmit or receive flows that need access to up-to-date transmit and receive activity for performing a load balancing algorithm, can access the private buffers safely for this up-to-date data. The SET kernel thread reads the kernel module's copy of the driver's configurable parameters and calls the appropriate set functions of the device driver's API for each parameter that needs updating.

The temp variables 30 enable achieving data integrity of the kernel module's 22 private copy of device data information 24 in a multi-threaded environment. Both the high priority kernel module 22 flows (timer, receive, transmit, etc.) and the kernel threads 26 and 28 may access the data 24 simultaneously. For example, a kernel thread (26 or 28) might be reading the data 24 while a high priority flow is attempting to modify it, or vise versa. Therefore, data integrity requires the use of a lock that both the kernel threads 26 and 28 and the high priority kernel module 22 flows must hold at any attempt to access the data 24. However, since a high priority kernel module 22 flow may interrupt a kernel thread (26 or 28) and switch it out by a context switch, while the lower context kernel thread (26 or 28) is still holding the lock, a deadlock will occur when the interrupting high priority flow attempts to hold the same lock. Hence, before attempting to hold the lock, the kernel thread (26 or 28) must disable from running any higher priority flows (bottom half and/or IRQ) that are known to hold the same lock. The temp variables 30 are required because it is not safe to access the device drivers API 21 while the bottom-half and/or IRQ are disabled since scheduling is not allowed by the kernel under these circumstances. Thus, the lock may be held with bottom half and/or IRQ disabled only while copying all parameter values and SET flags to and from the temporary variables 30 but not around the actual call to the device driver's API 21.

Figure 2:
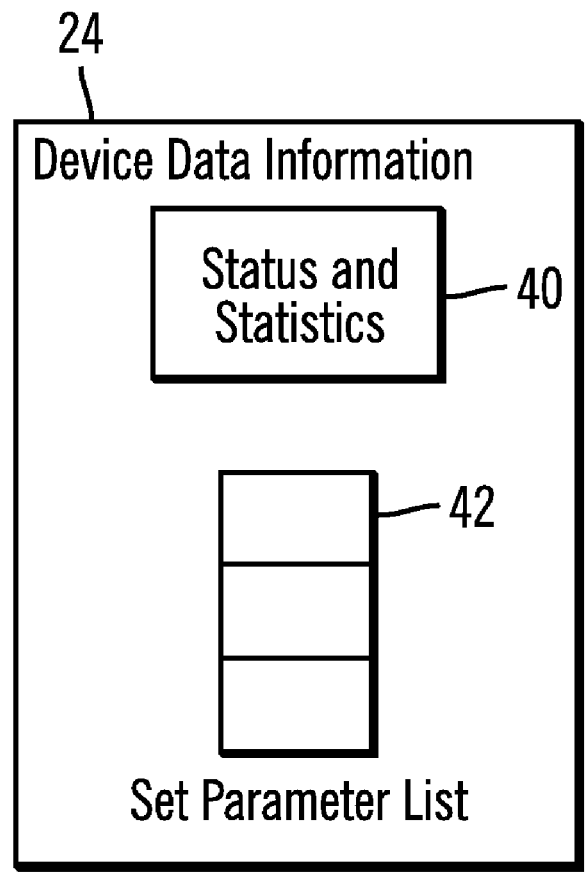
FIG. 2 illustrates device information used in accordance with described embodiments of the invention.

FIG. 2 illustrates the kernel module's private copy of the device information 24 as including: dynamic device information 40 as recently gathered from the device 10 and adaptor configurable parameters values 42. For a network adaptor, the statistics and status 40 may include up-to-date link status and receive and transmit activity. The configurable parameters may include the adaptor MAC address, packet filter and multicast list, etc. The device information 24 may further maintain a set parameter list 42 which is a list of parameters including parameter values that the kernel module would like to set in the device 10 through the SET kernel thread 26.

Figure 3:
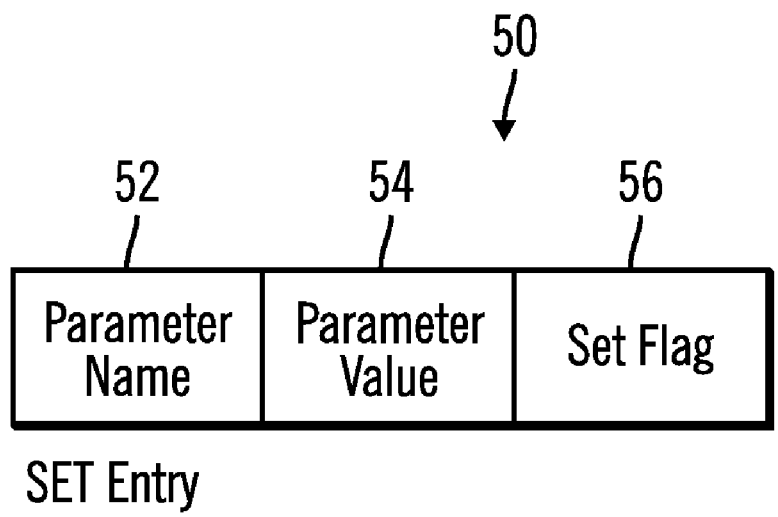
FIG. 3 illustrates information maintained on parameter values to set in a device in accordance with described embodiments of the invention.

FIG. 3 illustrates information maintained in each parameter entry 50 in the SET parameter list 42, including:

parameter name 52: includes a name of a parameter in the device 10.

parameter value 54: a value for the name parameter to set.

SET flag 56: flag indicating whether there is a new value for parameter to set.

FIG. 4 illustrates operations performed by the GET kernel thread 28 to update the kernel module's copy of the status and statistics 40 for the device 10. The GET kernel thread 28 may be wakened periodically to execute or may be invoked by the kernel module 22 in response to an event, such as a signal from the device 10 of a state change. Upon awakening (at block 100), the GET kernel thread 28 executes (at block 102) device driver API 21 code to get device status and statistics for the attached device(s). The status and statistics are stored in temporary variables 30. The GET kernel thread 28 then disables the necessary high priority flows and holds the parameters lock for write (at block 104), and updates (at block 106) the kernel module private copy of the status and statistics 40 with information accessed from the device and stored in the temporary variables 30. The GET kernel thread 28 then releases the lock and re-enables the high priority flows (at block 108). If there are multiple attached devices, e.g., network adaptors 10, then the operations of FIG. 4 would be performed for each coupled device.

FIG. 5 illustrates operations performed by the by the kernel module 22 to get up-to-date status and statistics 40 for the device 10 when in bottom half and/or IRQ context. Upon the kernel module 22 needing (at block 110) to get status or statistics 40 for the device 10, the kernel module 22 holds the parameters lock for read (112) and then reads the value of the variable of interest from its private buffer of status and statistics 40 (at block 114). The lock is then released (at block 116).

FIG. 6 illustrates operations performed by the kernel module 22 to set a parameter of the device driver 14, when in bottom half and/or IRQ context. Upon the kernel module 22 needing (at block 120) to set a device driver 14 parameter, the kernel module 22 locks (at block 122) the parameter entry 50 and then updates (at block 124) the parameter entry 50 with a parameter value 54 and the set flag 56 of the parameter is set. The lock is then released (at block 126). The SET thread 26 is then awakened (at block 128) to set the parameter value in the device driver 14.

Figure 7:
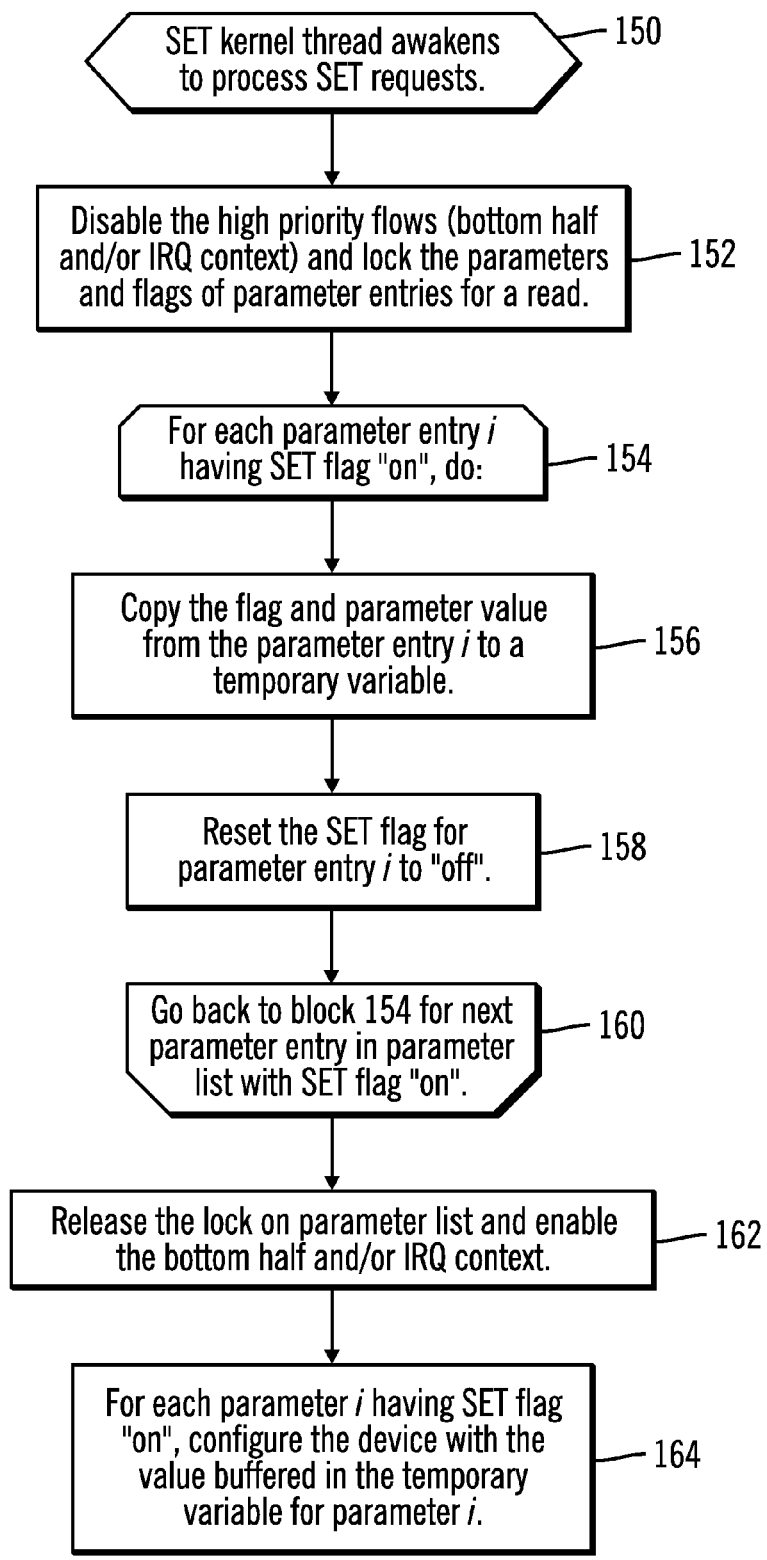

FIG. 7 illustrates operations performed by the SET kernel thread 26 when the thread is awakened. When invoked (at block 150), the SET kernel thread 26 processes the SET parameter list 42 in the device information 24. The necessary high priority flows are disabled and parameter values 54 and flags 56 in the SET parameter list 42 are locked (at block 152) so that they are not changed while the SET thread is reading the values to be set.

After obtaining the lock, a loop is then performed from block 154 through 160 for each parameter entry i whose SET flag is set. At block 156, the SET thread 26 copies the flag 56 and parameter value 54 from the parameter entry i to a temporary variable 30 and then resets (at block 158) the SET flag 56 to "off" so that it can now be re-set again when another set operation comes along. After copying to the temporary variable 30, the SET thread 26 then releases (at block 162) the lock on the parameter list 42 and enables the bottom-half and/or IRQ context. The device driver 14 can now be set according to the values and flags stored in the temporary variables 30. The SET thread 26 then configures (at block 164) the device with the parameter value buffered in the temporary variable 30 for each parameter having the SET flag 56 "on".

Figure 8:
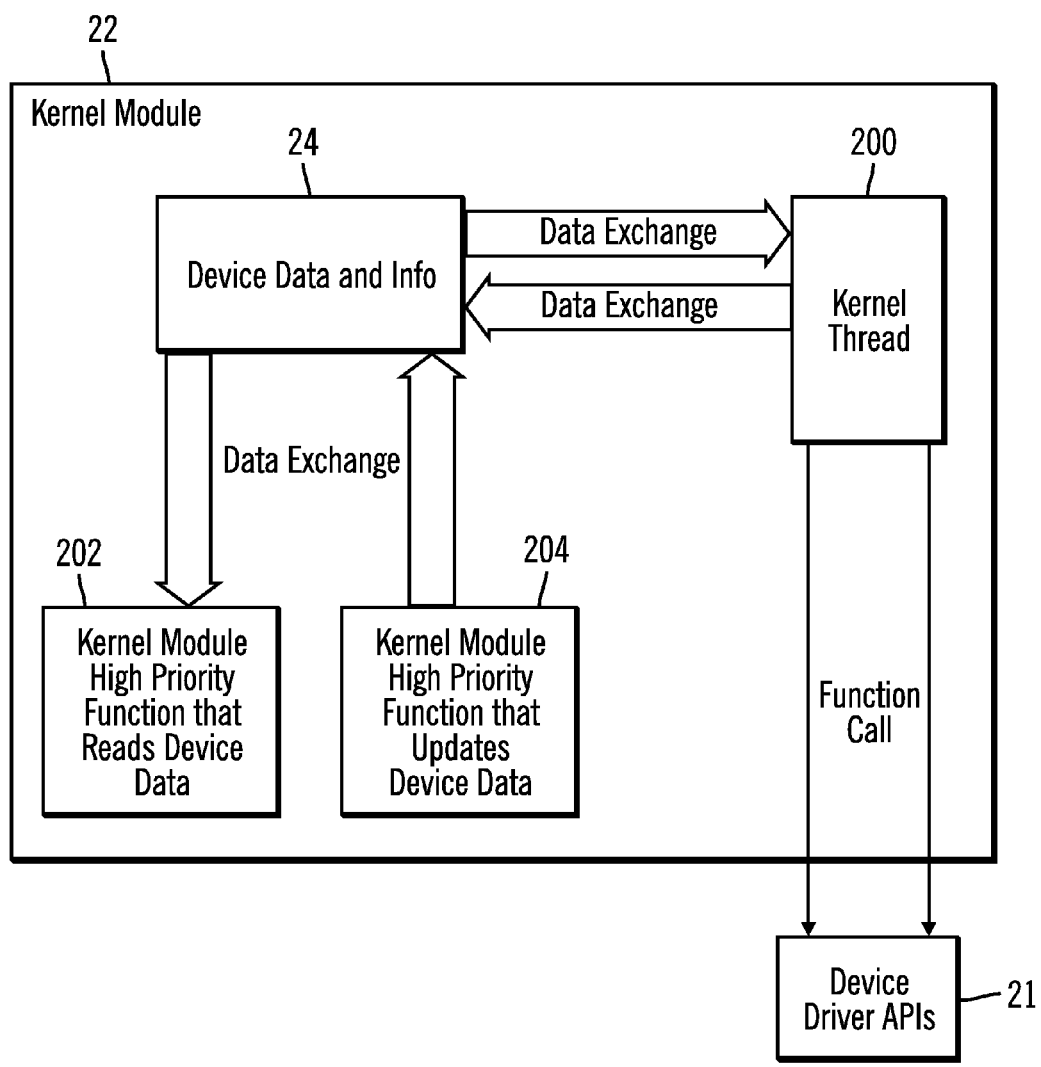
FIG. 8 illustrates a further embodiment of the kernel module.

FIG. 8 illustrates a further embodiment of the kernel module 22 with a kernel thread 200. The kernel thread 200 may comprise a single function that can be scheduled by the kernel module 22 to run either periodically or immediately and perform operations the kernel module is not capable of performing. The code that implements the kernel thread 200 may comprise a kernel module function that runs in the desired context. The data exchange between the high priority kernel module functions and the kernel module's private buffer 24 and between the kernel threads 200 and the buffer 24 may be performed asynchronously. FIG. 8 illustrates two high priority functions 202 and 204, read function 202 that reads data from the device data info 24 and update function 204 that writes new data to the buffer 24 while asynchronously the SET thread 26 (FIG. 1) reads that data and sets it in the device driver via the device driver's API 21. The GET thread 28 (FIG. 1) calls the device driver's API 21 periodically to maintain the buffered data updated while the high priority kernel read function 202 may read data from the buffer asynchronously as needed:

With the described implementations, the kernel module 22 spawns threads to perform device driver API operations as a deferred procedure call. The kernel module calls to the device driver APIs may be made from different contexts, e.g., user or kernel mode priority.

Additional Embodiment Details

The described techniques for managing device driver operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described implementations, the kernel module 22 spawned two different kernel threads, GET and SET. In further implementations, the kernel module 22 may spawn additional threads to perform specific or groups of device driver API operations. Still further, a single kernel thread may be spawned to handle all device driver operations.

In further implementations, additional kernel modules may be implemented to handle the device driver APIs for different devices and device drivers. For instance, one kernel module may be spawned to handle the device driver APIs for a network adaptor and another for a video controller, a storage device, printer, etc. Thus, the kernel module and kernel thread operations described herein may be used with a network device and other types of devices.

In the described implementations, the kernel module handling the device driver operations is implemented in a computer coupled devices over a bus. In alternative implementations, the kernel module may be implemented in any type of electronic device communicating with other devices, such as a hand held computer, a palm top computer, a laptop computer, a network switch or router, a telephony device, a network appliance, a wireless device, etc. FIGS. 1, 2, and 3 illustrate certain device information maintained in the computer memory. In alternative implementations, additional or different types of information may be maintained.

In certain implementations, the device driver and network adaptor embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In certain implementations, the network adaptor may be configured to transmit data across a cable connected to a port on the network adaptor. Alternatively, the network adaptor embodiments may be configured to transmit data over a wireless network or connection, such as wireless LAN, Bluetooth, Wireless Fidelity (Wi-Fi), etc.

In certain implementations, the device driver and network adaptor embodiments may be implemented in a computer system including a video controller to render information to display on a monitor coupled to the computer system including the device driver and network adaptor, such as a computer system comprising a desktop, workstation, server, mainframe, laptop, handheld computer, etc. Alternatively, the network adaptor and device driver embodiments may be implemented in a computing device that does not include a video controller, such as a switch, router, etc.

Figure 9:
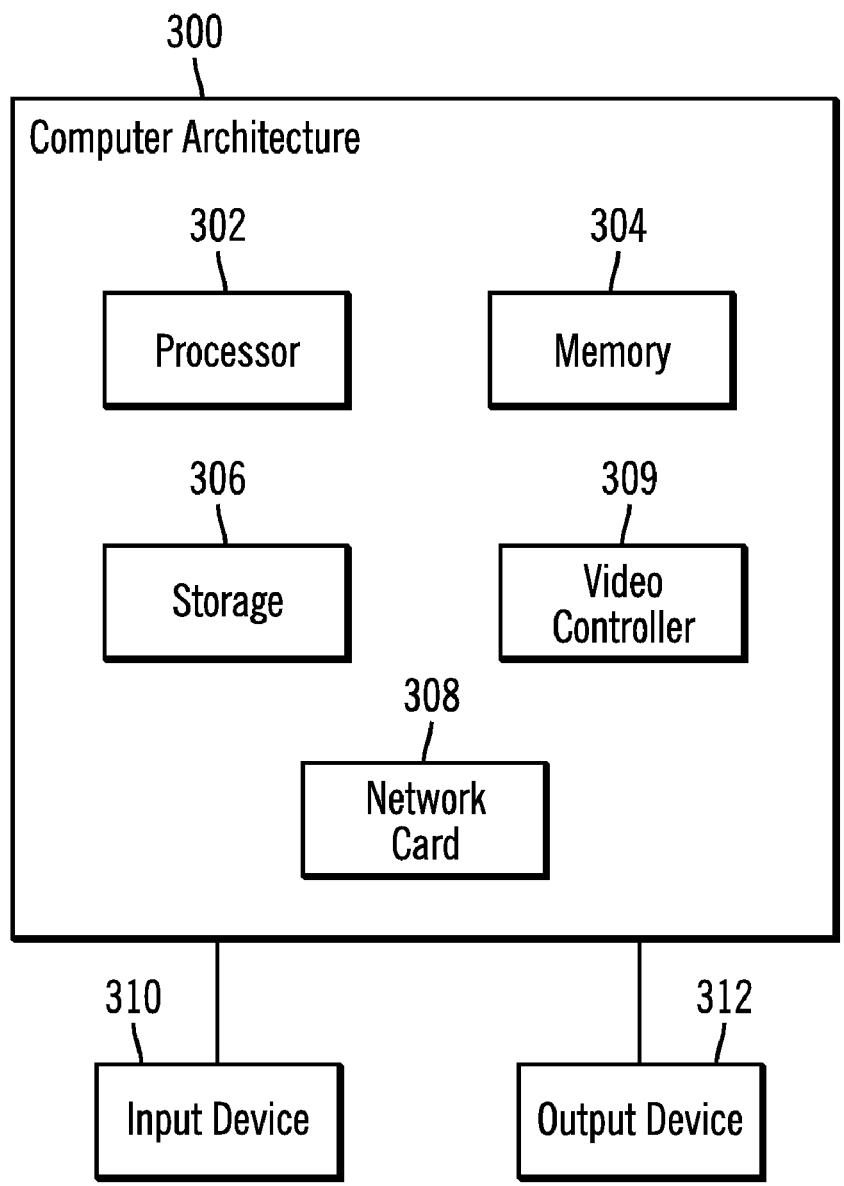
FIG. 9 illustrates a computing architecture which may be used with the described embodiments.

FIG. 9 illustrates one implementation of a computer architecture 300 of the network components, such as the hosts and storage devices shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network, such as an Ethernet, a Fibre Channel Arbitrated Loop, etc. Further, the architecture may, in certain embodiments, include a video controller 309 to render information on a display monitor, where the video controller 309 may be implemented on a video card or integrated on integrated circuit components mounted on the motherboard. As discussed, certain of the network devices may have multiple network cards. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The illustrated operations of FIGS. 4, 5, 6, and 7 illustrate the device driver operations occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit, multi-processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for communicating with a device, comprising:
   executing a kernel module in a memory;
   executing at least one kernel thread in the memory to execute device driver functions for the kernel module, wherein the device driver functions are capable of being invoked by system calls from applications operating in a user context;
   executing, with the at least one kernel thread, calls to device driver functions for the kernel module running in a kernel context;
   buffering a parameter list;
   accessing, with one of the at least one kernel thread, device information from the device;
   setting device values in the buffered parameter list to the accessed device information from the device;
   setting a flag indicating that the at least one kernel thread needs to set parameters at the device to device parameter values set in the buffered parameter list; and
   processing, by one of the at least one kernel thread, the buffered parameter list in response to the flag being set by performing:
     applying a lock on information in the buffered parameter list including the device parameter values;
     after applying the lock, copying the device parameter values from the buffered parameter list to a temporary buffer, wherein parameters at the device are set to the device parameter values from the buffered parameter list in the temporary buffer; and
     releasing the lock after copying the device parameter values from the buffered parameter list to the temporary buffer.

2. The method of claim 1, wherein the kernel module spawns the at least one kernel thread to execute the calls to the device driver functions for the kernel module.

3. The method of claim 1, wherein a kernel module function requests device information, further comprising:
   in response to the request for the device information, accessing the buffered device information.

4. The method of claim 1, wherein the at least one kernel thread accesses buffered device information periodically and independently of kernel module requests for the device information.

5. The method of claim 1, further comprising:
   spawning a kernel thread to set device parameters to parameter values buffered in the parameter list.

6. The method of claim 5, wherein the kernel thread spawned to set device parameter values processes the parameter list to locate buffered parameter values and set the device parameters to the buffered parameter values.

7. The method of claim 1, further comprising:
   disabling higher priority contexts before locking the parameter list; and
   enabling the higher priority contexts after releasing the lock on the parameter list.

8. The method of claim 7, wherein the higher priority context comprises a bottom half or Interrupt Request (IRQ) context.

9. The method of claim 1, further comprising:
   after releasing the lock, executing device driver functions to configure the device with the parameter values in the temporary buffer.

10. The method of claim 1, further comprising:
    initiating, with the kernel module, an access request with respect to device information;
    disabling any higher priority contexts capable of accessing the device information;
    obtaining a lock for the device information subject to the access request;
    providing the kernel module access to the device information;
    releasing the lock; and
    enabling all higher priority contexts that were disabled.

11. A system, comprising:
    a network device;
    a memory;
    a processor executing code to perform:
      execute a network device driver in memory to control the network device;
      execute a kernel module in the memory;
      execute at least one kernel thread in the memory to execute device driver functions for the kernel module, wherein the device driver functions are capable of being invoked by system calls from applications operating in a user context;
      execute, with the at least one kernel thread, calls to device driver functions for the kernel module running in a kernel context;
      buffering a parameter list;
      accessing, with one of the at least one kernel thread, device information from the device;
      setting device values in the buffered parameter list to the accessed device information from the device;
      setting a flag indicating that the kernel thread needs to set parameters at the device to device parameter values set in the buffered parameter list; and
      processing, by one of the at least one kernel thread, the buffered parameter list in response to the flag being set by performing:
        applying a lock on information in the buffered parameter list including device parameter values;
        after applying the look, copying the device parameter values from the buffered parameter list to a temporary buffer, wherein parameters at the device are set to the parameter values from the buffered parameter list in the temporary buffer; and
        releasing the lock after copying the parameter values from the buffered parameter list to the temporary buffer.

12. The system of claim 11, wherein the kernel module spawns the at least one kernel thread to execute the called device driver functions.

13. The system of claim 11, wherein a kernel module function requests device information, wherein the processor executes the code to further perform:

in response to the request for the device information, accessing the buffered device information.

14. The system of claim 11, wherein the at least one kernel thread accesses device information periodically and independently of kernel module requests for device information.

15. The system of claim 11, wherein the at least one kernel thread spawned to set device parameter values processes the parameter list to locate buffered parameter values and set the device parameters to the buffered parameter values.

16. The system of claim 11, wherein the processor executes the code to further perform:
   disabling higher priority context before locking the parameter list; and
   enabling the higher priority contexts after releasing the lock on the parameter list.

17. The system of claim 11, wherein the processor executes the code to further perform:
   after releasing the lock, executing device driver functions to configure the device with the parameter values in the temporary buffer.

18. The system of claim 11, wherein the processor executes the code to further perform:
   initiating, with the kernel module, an access request with respect to device information;
   disabling any higher priority contexts capable of accessing the device information;
   obtaining a lock for the device information subject to the access request;
   providing the kernel module access to tube device information;
   releasing the lock; and
   enabling all higher priority contexts that were disabled.

19. An article of manufacture comprising a computer readable storage medium having code executed fry a processor for communicating with a device and to perform operations, the operations comprising:
   executing a kernel module;
   executing at least one kernel thread to execute device driver functions for the kernel module, wherein the device driver functions are capable of being invoked system calls from applications operating in a user context;
   executing, with the at least one kernel thread, calls to device driver functions for the kernel module running in a kernel context;
   buffering a parameter list;
   accessing, with one of the at least one kernel thread, device information from the device;
   setting device values in the buffered parameter list to the accessed device information from the device;
   setting a flag indicating that the at least one kernel thread needs to set parameters at the device to device parameter values set in the buffered parameter list; and
   processing, by one of the at least one kernel thread, the buffered parameter list in response to the flap being set by performing;
   applying a lock on information in the buffered parameter list including the device parameter values;
   after applying the lock, copying the device parameter values from the buffered parameter list to a temporary buffer, wherein parameters at the device are set to the device parameter values from the buffered parameter list in the temporary buffer; and
   releasing the lock after copying the parameter values from the buffered parameter list to the temporary buffer.

20. The article of manufacture of claim 19, wherein the kernel module spawns at least one kernel thread to execute the called device driver functions.

21. The article of manufacture of claim 19, wherein a kernel module function requests device information, wherein the operations further comprise:
   in response to a request for the device information, accessing the buffered device information.

22. The article of manufacture of claim 19, wherein the at least one kernel thread accesses buffered device information periodically and independently of kernel module requests for device information.

23. The article of manufacture of claim 19, wherein the at least one kernel thread spawned to set device parameter values processes the parameter list to locate buffered parameter values and set the device parameters to the buffered parameter values.

24. The article of manufacture of claim 19, wherein the operations further comprise:
   disabling higher priority contexts before locking the parameter list; and
   enabling the higher priority contexts after releasing the lock on the parameter list.

25. The article of manufacture of claim 24, wherein the higher priority context comprises a bottom half or Interrupt Request (IRQ) context.

26. The article of manufacture of claim 19, wherein the operations further comprise:
   after releasing the lock, executing device driver functions to configure the device with the parameter values in the temporary buffer.

27. The article of manufacture of claim 19, wherein the code executes operations to further perform:
   initiating, with the kernel module, an access request with respect to device information;
   disabling any higher priority contexts capable of accessing the device information;
   obtaining a lock for the device information subject to the access request;
   providing the kernel module access to the device information;
   releasing the lock; and
   enabling all higher priority contexts that were disabled.

* * * * *

UNITED STATES PATENT AND TRADEMARK OFFICE
CERTIFICATE OF CORRECTION

PATENT NO. : 7,404,193 B2
APPLICATION NO. : 10/654743
DATED : July 22, 2008
INVENTOR(S) : Shmuel Hen and Tsippy Mendelson It is certified that error appears in the above-identified patent and that said Letters Patent is hereby corrected as shown below:

Col. 8, Line 54, delete "look" and replace with --lock--.
Col. 9, Line 29, delete "tube" and replace with --the--.
Col. 9, Line 34, delete "fry" and replace with --by--.
Col. 9, Line 54, delete "flap" and replace with --flag--.

Signed and Sealed this

Sixteenth Day of November, 2010

David J. Kappos
*Director of the United States Patent and Trademark Office*